US008954565B2

(12) United States Patent
Siddam et al.

(10) Patent No.: US 8,954,565 B2
(45) Date of Patent: Feb. 10, 2015

(54) METHOD AND SYSTEM FOR DETERMINING A PCC RULE WAITING FOR FURTHER ACTION

(75) Inventors: Kalyan Premchand Siddam, Nepean (CA); Kevin Scott Cutler, Carp, CA (US); Haiqing Ma, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1057 days.

(21) Appl. No.: 12/823,759

(22) Filed: Jun. 25, 2010

(65) Prior Publication Data

US 2011/0320584 A1 Dec. 29, 2011

(51) Int. Cl.
*G06F 15/173* (2006.01)
*G06Q 30/00* (2012.01)

(52) U.S. Cl.
CPC .................................... *G06Q 30/00* (2013.01)
USPC ........................................................ 709/224

(58) Field of Classification Search
None
See application file for complete search history.

(56) References Cited

U.S. PATENT DOCUMENTS

| | | | | |
|---|---|---|---|---|
| 8,175,576 | B2 * | 5/2012 | Przybysz et al. | 455/406 |
| 2007/0123213 | A1 * | 5/2007 | Wu | 455/406 |
| 2008/0267154 | A1 * | 10/2008 | Johansson et al. | 370/338 |
| 2009/0215454 | A1 * | 8/2009 | Przybysz et al. | 455/435.1 |
| 2011/0202491 | A1 * | 8/2011 | Pandya et al. | 706/47 |
| 2012/0023246 | A1 * | 1/2012 | Castro Castro et al. | 709/229 |
| 2012/0026979 | A1 * | 2/2012 | Rommer et al. | 370/331 |

FOREIGN PATENT DOCUMENTS

WO WO 2009118038 A1 * 10/2009

OTHER PUBLICATIONS

ETSI TS 129 212, "Universal Mobile Telecommunications System (UMTS); LTE; Policy and Charging Control Over Gx Reference Point (3GPP TS 29.212 version 9.2.0 Release 9)", 2010.

ETSI TS 129 213, "Digital Cellular Telecommunications System (Phase 2+); Universal Mobile Telecommunications System (UMTS); LTE; Policy and Charging Control Signalling Flows and Quality of Service (QoS) Parameter Mapping (3GPP TS 29.213 version 9.2.0 Release 9)", 2010 .

ETSI TS 129 214, "Universal Mobile Telecommunications System (UMTS); LTE; Policy and Charging Control Over Rx Reference Point (3GPP TS 29.214 version 9.3.0 Release 9)", 2010.

* cited by examiner

*Primary Examiner* — Ninos Donabed
*Assistant Examiner* — Thomas Richardson
(74) *Attorney, Agent, or Firm* — Kramer & Amado, P.C.

(57) ABSTRACT

Various exemplary embodiments relate to a method and related network node including one or more of the following: receiving, at a policy and charging rules node from a first requesting device, a first message including a first set of information regarding an application request; generating a set of PCC rules for fulfilling the application request based on the first set of information; determining whether the PCRN should wait for a period of time for at least one PCC rule to receive a second message including a second set of information regarding the application request; and if the PCRN should wait for the period of time: waiting for the period of time to receive a second message including a second set of information regarding the application request, determining, after the time has elapsed, whether the second message has arrived, and if the second message has not arrived, initiating a cleanup procedure.

18 Claims, 4 Drawing Sheets

FIG. 3

300

| | RULE NAME (305) | USER ID (310) | SERVICE DATA FLOW FILTER (315) | BEARER ID (320) | BEARER CONTROL MODE (325) |
|---|---|---|---|---|---|
| 330 | 0xE426 | 0x342F | 0x90F2CE32... | 0x3464 | UE_NW |
| 335 | 0x99B2 | 0xB790 | 0xB2B56FE1... | 0xB544 | UE_ONLY |
| 340 | 0x4E3A | 0x05DA | 0x539F32E6... | – | UE_ONLY |
| 345 | 0x5CC2 | 0x05DA | 0x13ED3B01... | – | UE_ONLY |
| 350 | ... | ... | ... | ... | ... |

FIG. 4

400

| | RULE NAMES (405) | TASK CREATED (410) |
|---|---|---|
| 415 | {0x99B2} | 21120147 |
| 420 | {0x4E3A; 0x5CC2} | 21120191 |
| 425 | ... | ... |

METHOD AND SYSTEM FOR DETERMINING A PCC RULE WAITING FOR FURTHER ACTION

TECHNICAL FIELD

Various exemplary embodiments disclosed herein relate generally to policy and charging in telecommunications networks.

BACKGROUND

As demand increases for varying types of applications within mobile telecommunications networks, service providers constantly upgrade their systems in order to reliably provide an expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks. As seen in second and third generation networks, voice services must be carried over dedicated voice channels and directed toward a circuit-switched core, while other service communications are transmitted according to the internet protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "long term evolution" (LTE). In an LTE network, all communications are carried over an IP channel from user equipment (UE) to an all IP core called the packet core (PC). The PC then provides gateway access to other networks while ensuring an acceptable QoE and charging a subscriber for their particular network activity.

The 3GPP generally describes the components of the PC and their interactions with each other in a number of technical specifications. Specifically, 3GPP TS 29.212, 3GPP TS 29.213, and 3GPP TS 29.214 describe the policy and charging rules function (PCRF), policy and charging enforcement function (PCEF), and bearer binding and event reporting function (BBERF) of the PC. These specifications further provide some guidance as to how these elements interact in order to provide reliable data services and charge subscribers for use thereof.

For example, 3GPP TS 29.212, 3GPP TS 29.213, and 3GPP TS 29.214 provide some guidance on the establishment of an application session by the PC upon receipt of an application request from an application function (AF) in the form of an AA-Request (AAR) message or from a packet data network gateway (PGW) in the form of a Credit Control Request (CCR) message. The standards specify that a single application request may be defined by both an AAR and a CCR.

The 3GPP standards do not, however, describe how the PCRF should ensure that, when an application request is to be based on multiple requests, the resulting PCC and QoS rules are in fact based on the full application request. Without such functionality, incomplete, malformed, or otherwise inappropriate rules may be installed, thus wasting system resources and providing improper functionality to users.

In view of the foregoing, it would be desirable to provide a method for ensuring that PCC rules are properly formed. In particular, it would be desirable to ensure that PCC rules in force are based on all relevant and/or required messages defining the associated application request.

SUMMARY

In light of the present need for a method for ensuring that PCC rules are properly formed, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network node including one or more of the following: receiving, at the PCRN from a first requesting device, a first message including a first set of information regarding an application request; generating a set of PCC rules for fulfilling the application request based on the first set of information; determining whether the PCRN should wait for a period of time for at least one PCC rule to receive a second message including a second set of information regarding the application request; and if the PCRN should wait for the period of time; waiting for the period of time to receive a second message including a second set of information regarding the application request, determining, after the period of time has elapsed, whether the second message has arrived, and if the second message has not arrived, initiating a cleanup procedure.

According to the foregoing, various exemplary embodiments provide for a system that utilizes a robust method for ensuring that only valid rules are installed at various network components. Particularly, by waiting for a period of time to receive a complementary message, a PCRN may clean up only those rules for which the PCRN is unlikely to receive a complementary message.

BRIEF DESCRIPTION OF THE DRAWINGS

In order to better understand various exemplary embodiments, reference is made to the accompanying drawings, wherein;

FIG. 3 illustrates an exemplary data arrangement for storing PCC rules;

FIG. 4 illustrates an exemplary data arrangement for storing deferred tasks;

DETAILED DESCRIPTION

Figure 1:
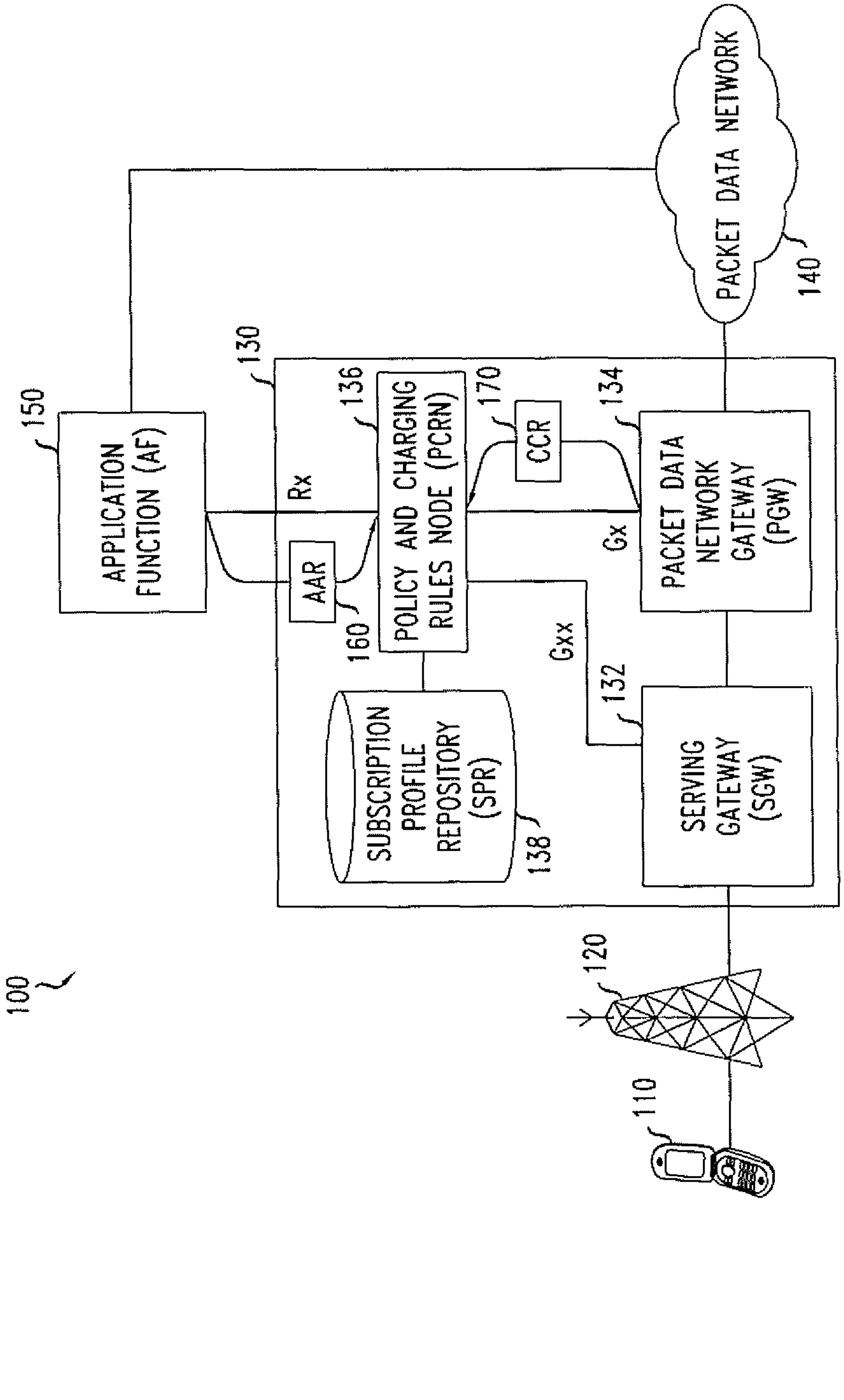
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a communications network, such as a general packet radio service (GPRS), LTE, or 4G mobile communications network, for providing access to various services. The network 100 may include user equipment 110, base station 120, packet core (PC) 130, packet data network 140, and application function (AF) 150.

User equipment 110 may be a device that communicates with packet data network 140 for providing an end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via PC 130.

Base station 120 may be a device that enables communication between user equipment 110 and PC 130. For example, base station 120 may include a base transceiver station such as an evolved nodeB (eNodeB) as defined by 3GPP standards. Additionally or alternatively, base station 120 may include a radio network controller (RNC). Thus, base station 120 may be a device that communicates with user equipment 110 via a first medium, such as radio waves, and communicates with PC 130 via a second medium, such as Ethernet cable. Base station 120 may be in direct communication with PC 130 or may communicate via a number of intermediate nodes (not shown). In various embodiments, multiple base stations (not shown) may be present to provide mobility to user equipment 110. Note that in various alternative embodiments, user equipment 110 may communicate directly with PC 130. In such embodiments, base station 120 may not be present.

Packet core (PC) 130 may be a device or association of devices that provides user equipment 110 with gateway access to packet data network 140. PC 130 may further charge a subscriber for use of provided data services and ensure that particular quality of experience (QoE) standards are met. Thus, PC 130 may be a packet core implemented, at least in part, according to the GPRS standard. Alternatively, PC 130 may be implemented, at least in part, according to the 3GPP TS 29.212, 29.213, and 29.214 standards. Accordingly, PC 130 may include a serving gateway (SGW) 132, a packet data network gateway (PGW) 134, a policy and charging rules node (PCRN) 136, and a subscription profile repository (SPR) 138. Alternatively, PC 130 may be any other packet core known to those of skill in the art.

Serving gateway (SGW) 132 may be a device that provides gateway access to the PC 130 to an end user of network 100. SGW 132 may be the first device within the PC 130 that receives packets sent by user equipment 110. SGW 132 may forward such packets toward PGW 134. In various embodiments, SGW 132 may include a serving GPRS support node (SGSN). SGW 132 may perform a number of functions such as, for example, managing mobility of user equipment 110 between multiple base stations (not shown) and enforcing particular quality of service (QoS) characteristics for each flow being served. In various implementations, such as those implementing the proxy mobile IP (PMIP) standard, SGW 132 may include a bearer binding and event reporting function (BBERF). In various exemplary embodiments, PC 130 may include multiple serving gateways (SGWs) (not shown) and each SGW may communicate with multiple base stations (not shown). In such embodiments, additional SGWs (not shown) may be designated as non-primary SGWs (NP-SGWs) (not shown) for user equipment 110.

Packet data network gateway (PGW) 134 may be a device that provides gateway access to packet data network 140 to an end user of network 100. PGW 134 may be the final device within the PC 130 that receives packets sent by user equipment 110 toward packet data network 140 via SGW 132. In various embodiments, PGW 134 may include a gateway GPRS support node (GGSN). PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services. Upon receiving a request for an unknown application service from UE 110, PGW 134 may construct a credit control request (CCR) that requests an appropriate allocation of resources and forward the CCR to PCRN 136.

It should be noted that while exemplary network 100 may correspond to one particular implementation of general packet radio service (GPRS), many variations may exist. For example, SGW 132 may not be present, PGW 134 may not be present, and/or the functions of SGW 132 and PGW 134 may be consolidated into a single device or spread across multiple additional devices. Alternatively, non-GPRS networks such as, for example, LTE, 3G, or 4G, could be used.

Policy and charging rules node (PCRN) 136 may be a device that receives requests related to service data flows (SDFs) and IP-CAN sessions, generates PCC rules, and provides PCC rules to the PGW 134 and/or other PCENs (not shown). PCRN 136 may be in communication with AF 150 via an Rx interface. PCRN 136 may receive an application request in the form of an AA-request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive a request in the form of a credit control request (CCR) 170 from SGW 132 or PGW 134. As with AAR 160, upon receipt of CCR 170, PCRN may take appropriate action in response, such as, for example, generating at least one new PCC rule for fulfilling and/or responding to the CCR 170. In various embodiments, AAR 160 and CCR 170 may represent two independent requests to be processed separately, while in other embodiments, AAR 160 and CCR 170 may carry information regarding a single request, and PCRN 136 may take action based on the combination of AAR 160 and CCR 170. In various embodiments, PCRN 136 may be capable of handling both single-message and paired-message requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate quality of service (QoS) rules. Upon creating a new QoS rule or upon request by the SGW 132, PCRN 136 may provide a QoS rule to SGW 132 via the Gxx interface.

As will be described in further detail below with respect to FIGS. 2-6, PCRN 136 may ensure that, when an application request defined by an AAR requires a complementary CCR, the PCC rules installed will be based on both messages. Further, when such a complementary CCR does not arrive, PCRN 136 may ensure that any action taken based on the AAR is cleaned up. For example, PCRN 136 may delete previously generated rules and inform the AF 150 that at least a portion of the request could not be fulfilled.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within PC 130.

Packet data network 140 may be a network (e.g., the Internet or another network of communications devices) for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the PC 130 via an Rx interface. When AF 150 is to begin providing known application service to user equipment 110, AF 150 may generate an application request message, such as an AA-request (AAR) 160 defined by the Diameter protocol, to notify the PCRN 136 that resources should be allocated for the application service. This application request message may include information such as an identification of a subscriber using the application service and an identification of the particular service data flows desired to be established in order to provide the requested service. AF 150 may communicate such an application request to the PCRN 136 via the Rx interface.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-6.

PCRN 136 may receive AAR 160 from AF 150 and generate a set of PCC rules based on the information therein. PCRN 136 may further determine that the PCC rules require information from a complementary CCR (not shown). For example, PCRN may determine that a bearer control mode for the PCC rules is set to UE_ONLY, indicating that only requests having components originating from the UE 110, such as CCR 170, should be fulfilled. If CCR 170 has not already been received, PCRN 136 may wait for a period of time such as, for example, 200 ms to receive CCR 170. If, after the period of time has elapsed, CCR 170 still has not arrived, PCRN 136 may initiate a cleanup procedure. For example, PCRN 136 may uninstall the PCC and/or rules from SGW 132 and/or PGW 134 if they were previously installed, delete the rules from local storage, and/or inform AF 150 that the request in AAR 160 could not be fulfilled via, for example, an authorization and authentication answer (AAA) or reauthorization request (RAR).

Figure 2:
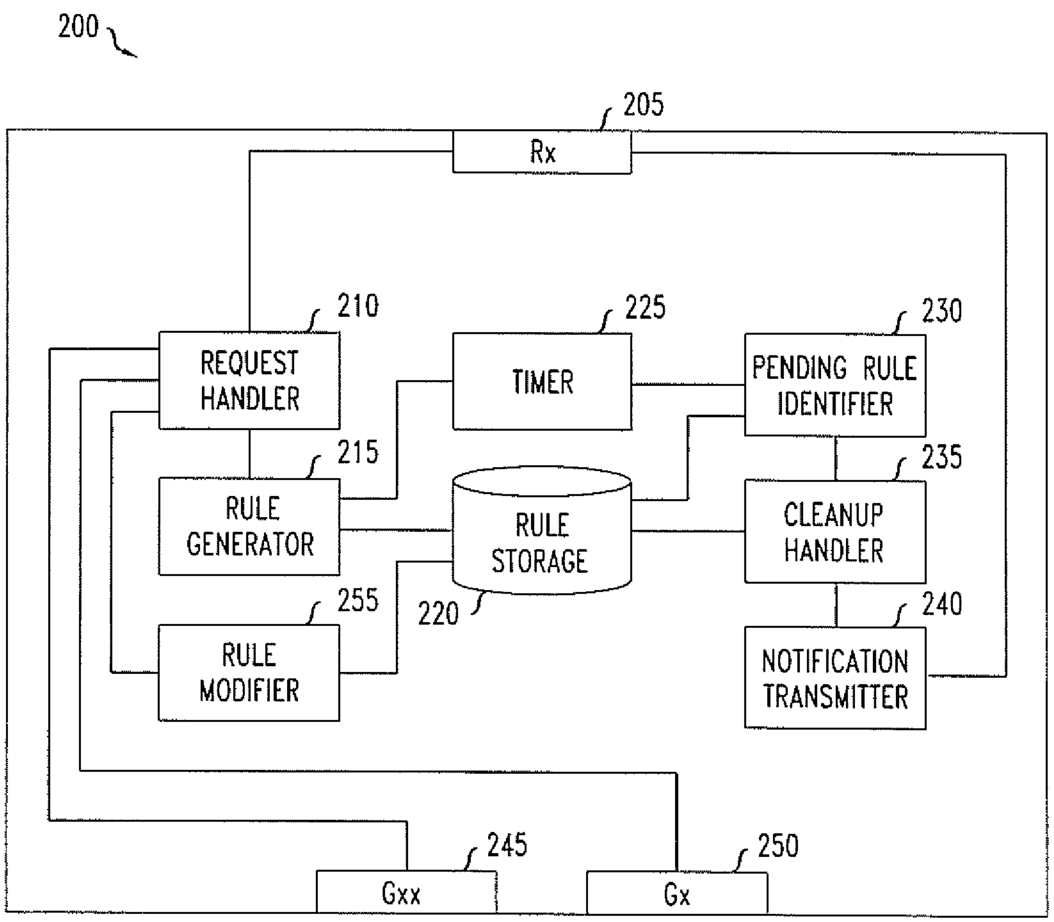
FIG. 2 illustrates an exemplary policy and charging rules node (PCRN) for determining when a policy and charging control (PCC) rule is awaiting further action.

FIG. 2 illustrates an exemplary policy and charging rules node (PCRN) 200 for determining when a policy and charging control (PCC) rule is awaiting further action. PCRN 300 may correspond to PCRN 136 and may include Rx interface 205, request handler 210, rule generator 215, rule storage 220, timer 225, pending rule identifier 230, cleanup handler 235, notification transmitter 240, Gxx interface 245, Gx interface 250, and rule modifier 255.

Rx interface 205 may be an interface comprising hardware and/or executable instructions encoded on a machine-readable storage medium configured to communicate with an AF such as AF 150. Such communication may be implemented according to the 3GPP TS 29.214. For example, Rx interface 205 may receive application requests, session requests, and event notifications in the form of an AAR, and transmit answers, rejections, and other status notifications in the form of an AAA or RAR.

Request handler 210 may include hardware and/or executable instructions on a machine-readable storage medium configured to receive messages via Rx interface 205, Gxx interface 245, and/or Gx interface 250 and route the messages appropriately. For example, request handler 210 may determine whether a received message is associated with a new application request or provides further detail with regard to a previously fulfilled application request. Request handler may determine whether the received message constitutes a complementary message for a previously received request according to any method known to those of skill in the art such as, for example, matching session binding identifiers (SBIs) and/or other data between the received message and existing PCC rules. If the received message represents a new application request, request handler 210 may forward the message to rule generator 215. If, instead, the received message is a complementary message for a previously received application request, request handler 210 may forward the message to rule modifier 255.

Rule generator 215 may include hardware and/or executable instructions on a machine-readable storage medium configured to generate PCC and/or QoS rules in response to new application requests. Rule generator 215 may generate a number of such rules to fulfill application requests, store the rules in rule storage 220, and transmit the rules to appropriate nodes for installation such as, for example, an SGW and/or PGW. Rule generator 215 may generate rules according to any method known to those of skill in the art. Accordingly, rule generator 215 may be adapted to determine whether to accept or reject a request, may confer with a SPR, and/or perform policy decisions with regard to each request.

Rule generator 215 may further be adapted to determine whether a newly generated rule is awaiting further action such as, for example, modification based on a complementary request message. Rule generator 215 may make this determination based on, for example, a bearer control mode and/or bearer identifier associated with each rule. If any rules are awaiting further action, rule generator 215 may forward the relevant rule names or the rules themselves to timer 225.

Rule storage 220 may be any machine-readable medium capable of storing PCC rules generated by the PCRN 200. Accordingly, rule storage 220 may include a machine-readable storage medium such as read-only memory (ROM), random-access memory (RAM), magnetic disk storage media, optical storage media, flash-memory devices, and/or similar storage media. As will be described in further detail below with respect to FIG. 3, rule storage 220 may store definitions of numerous PCC rules created by PCRN 200. Such definitions may include, for example, rule names, service data flow filters, QoS parameters, and charging parameters.

Timer 225 may include hardware and/or executable instructions on a machine-readable storage medium configured to wait for a period of time and subsequently initiate further processing of rules previously deemed to be awaiting further action. Such task deferment may be accomplished according to any method known to those of skill in the art. For example, timer 225 may simply place each task on a deferred task queue. Thereafter, timer 225 may initiate further processing for each task in the queue on a first-in-first-out basis, thereby delaying processing for an undetermined amount of time. As a further example, timer 225 may store an entry for each deferred task and wait a predetermined amount of time before initiating further processing. Such a predetermined amount of time may be hard-coded into the operation of PCRN 200 or may be a configurable value.

Pending rule identifier 230 may include hardware and/or executable instructions on a machine-readable storage medium configured to determine whether a particular set of PCC rules is awaiting further action upon initiation of further processing by timer 225. Pending rule identifier 230 may use a method identical or similar to that used by rule generator 215 to determine whether a set of rules is awaiting further action. If a set of rules is awaiting further action, pending rule identifier 230 may pass the set of rules to cleanup handler 235 for further action. Otherwise, pending rule identifier may take no further action.

Cleanup handler 235 may include hardware and/or executable instructions on a machine-readable storage medium configured to free or otherwise manage resources associated with rules awaiting further action. For example, cleanup handler 235 may instruct appropriate SGWs and PGWs to uninstall rules identified by pending rule identifier 230 as still awaiting further action. Cleanup handler 235 may further delete such rules from rule storage 220. In various alternative embodiments, cleanup handler 235 may take other action such as, for example, requesting further information from the appropriate SGW or PGW for construction of the rule. Cleanup handler 235 may then take action if there is no response to such a request or if the response indicates that the identified rule is not recognized Notification transmitter 240 may include hardware and/or executable instructions on a machine-readable storage medium configured to notify a requesting node that its request could not be fulfilled. If notification transmitter 240 receives an indication from cleanup handler 235 that one or more rules have been removed, notification transmitter may generate a RAR indicating to the requesting node that the PCRN 200 was unable to establish a requested flow. Notification transmitter 240 may then transmit the RAR to the appropriate node.

Gxx interface 245 may be an interface comprising hardware and/or executable instructions encoded on a machine-readable storage medium configured to communicate with an SGW such as SGW 132. Such communication may be implemented according to the 3GPP TS 29.212. Thus, Gxx interface 245 may transmit QoS rules for installation and rejections of application requests. Gxx interface 245 may further receive UE-originated application requests, session requests, and event notifications in the form of a CCR.

Gx interface 250 may be an interface comprising hardware and/or executable instructions encoded on a machine-readable storage medium configured to communicate with a PGW such as PGW 134. Such communication may be implemented according to the 3GPP TS 29.212. Thus, Gx interface 250 may receive transmit PCC rules for installation and rejections of application requests. Gx interface 250 may further receive UE-originated application requests, session requests, and event notifications in the form of a CCR.

Rule modifier 255 may include hardware and/or executable instructions on a machine-readable storage medium configured to modify PCC and/or QoS rules in accordance with a received complementary message. Rule modifier 255 may retrieve each relevant rule from rule storage 250 and update each rule based on the complementary message according to any method known to those of skill in the art. Rule modifier 255 may also transmit the updated rules to an SGW and/or PGW for installation.

FIG. 3 illustrates an exemplary data arrangement 300 for storing PCC rules. Data arrangement 300 may be, for example, a table in a database stored in rule storage 220 or at any other element internal or external to PCRN 200. Alternatively, data arrangement 300 could be a series of linked lists, an array, or a similar data structure. Thus, it should be apparent that data arrangement 300 is an abstraction of the underlying data; any data structure suitable for storage of the underlying data may be used.

Data arrangement 300 may contain numerous fields, such as rule name field 305, user ID field 310, service data flow (SDF) filter field 315, bearer ID field 320, and bearer control mode 325. Data arrangement 300 may contain additional fields (not shown) necessary or helpful in defining PCC rules such as, for example, an IP-CAN session identifier, charging parameters, and/or QoS information. It will be apparent to one of skill in the art that various modifications may be made to data arrangement 300 and the operation of PCRN 200. For example, in various alternative embodiments, data arrangement 300 may not contain bearer control mode field 325 and, instead, may contain a SGW identifier field (not shown). In such an embodiment, PCRN 200 may determine a bearer control mode by looking up a value associated with the identified SGW elsewhere.

Rule name field 305 may store a unique name for each PCC and/or QoS rule within the IP-CAN or Gateway Control Session. In various embodiments, corresponding PCC and QoS rules may have the same rule name or different rule names. User ID field 310 may store at least one identifier for the user or UE associated with a rule. This identifier may include a subscription identifier or some other means for uniquely identifying a user or UE. SDF filter field 315 may store a filter for identifying traffic to which a rule applies. Such a filter may be defined according to any method known to those of skill in the art.

Bearer ID field 320 may store a unique identifier for a bearer associated with a rule. In various embodiments, rules may not be associated with any bearer, in which case the bearer ID field 320 may be null or otherwise blank. Bearer control mode field 325 may indicate a bearer control mode associated with a SGW serving the SDF associated with the rule. Bearer control mode field 325 may carry a value of UE_NW, indicating that both UE- and network-initiated requests are allowed, or UE_ONLY, indicating that only UE-initiated requests are allowed.

As an example, rule record 330 indicates that a rule "0xE426" is associated with user "0x342F" and applies to traffic identified by the filter "0x90F2CE32 . . . ." The rule is further associated with a bearer "0x3464" and a bearer control mode of UE_NW. As a further example, rule record 335 describes a rule "0x99B2" associated with user "0xB790" and traffic identified by the SDF filter "0xB2B56FE1 . . . ." This rule is associated with the bearer "0xB544" and a bearer control mode of UE_ONLY.

Rule records 340, 345 describe rules "0x4E3A" and "0x5CC2," respectively, and are both associated with user "0x05DA." Rule record 340 is applicable to traffic identified by SDF filter "0x539F32E6 . . . " while rule record 345 is applicable to traffic identified by the SDF filter "0x13ED3B01 . . . ." Both rule records 340, 345 are associated with a bearer control mode of UE_ONLY and are not associated with any bearer. Data arrangement 300 may contain numerous additional rule records 350.

FIG. 4 illustrates an exemplary data arrangement 400 for storing deferred tasks. Data arrangement 200 may be, for example, a table in a database stored in rule storage 220, timer 225, or at any other element internal or external to PCRN 200. Alternatively, data arrangement 300 could be a series of linked lists, an array, or a similar data structure. Thus, it should be apparent that data arrangement 400 is an abstraction of the underlying data; any data structure suitable for storage of the underlying data may be used.

Data arrangement 400 may contain a number of fields such as, for example, a rule names field 405 and task created field 410. Data arrangement 400 may contain additional fields (not shown) necessary or helpful in defining a deferred task. It will be apparent to one of skill in the art that various modifications may be made to data arrangement 300 and the operation of PCRN 200. For example, in various alternative embodiments, data arrangement 400 may not exist independent of data arrangement 300. Accordingly, in such embodiments, data arrangement 300 may contain an additional task created field 410 for each rule.

Rule names field 405 may store a set of rule names associated with a deferred task. Each set of rule names may include one or more rule name. In various alternative embodiments, rule names field 405 may only store one rule name and one deferred task may be created for each rule awaiting further action. The rule names stored in rule names field 405 may correspond to rule names stored in rule name field 305 of data arrangement 300. Task created field 410 may store a system time corresponding to the time a task was created. Such a time value may be represented according to any method known to those of skill in the art. For example, task created field may store a Unix timestamp or a timestamp specific to the PCRN 200 that indicates a number of milliseconds that have elapsed since a PCRN 200 specific epoch. In various alternative embodiments wherein deferred tasks are simply placed on a deferral queue, task created field 410 may not be present.

As an example, deferred task 415 may relate to the rule "0x99B2" and may have been created at system time "21120147." As a further example, deferred task 420 may relate to the rules "0x4E3A" and "0x5CC2" and may have been created at system time "21120191." Data arrangement 400 may contain numerous additional deferred tasks 425.

Figure 5:
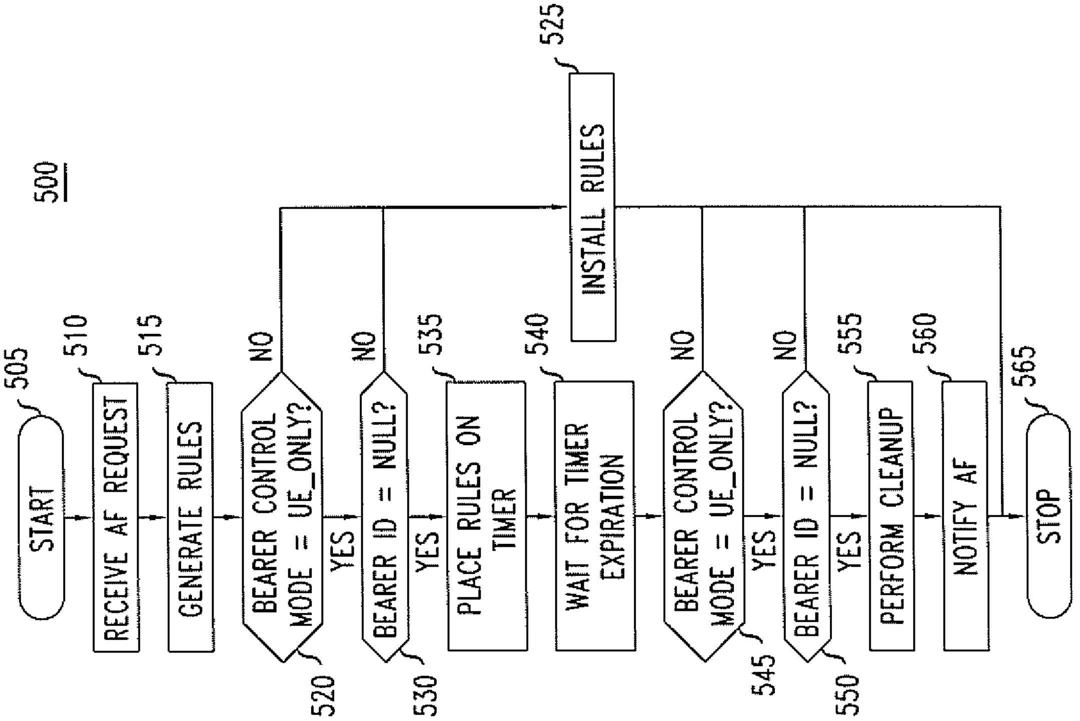
FIG. 5 illustrates an exemplary method for determining when a PCC rule is awaiting further action.

FIG. 5 illustrates an exemplary method 500 for determining when a PCC rule is awaiting further action. Method 500 may be performed by the components of PCRN 200 such as, for example, request handler 210, rule generator 215, timer 225, pending rule identifier 230, cleanup handler 235, and notification transmitter 240.

Method 500 may begin in step 505 and proceed to step 510 where PCRN 200 may receive a request message in the form of an AAR from an AF. PCRN 200 may proceed to generate rules in accordance with the request message in step 515. In various alternative embodiments, PCRN 200 may also install the rules in the appropriate network nodes at this step. Method 500 may then proceed to step 520, where PCRN 200 may determine whether a bearer control mode for any of the newly generated rules are associated with a bearer control mode of UE_ONLY.

If none of the rules are associated with a UE_ONLY control mode, method 500 may proceed to step 525 where PCRN 200 may install the rules in the appropriate network nodes. Method 500 may then proceed to end in step 565. In various alternative embodiments wherein rules are installed at step 515, method 500 may not include step 525 and may, instead, proceed directly to step 565.

If, however, at least one rule has a bearer control mode of UE_ONLY, method 500 may proceed from step 520 to step 530. At step 530, PCRN 200 may determine whether any of the UE_ONLY rules are not yet associated with a bearer ID. If all UE_ONLY rules are already associated with a bearer ID, method 500 may proceed to step 525 or, alternatively, to step 565. If at least one UE_ONLY rule has a null or blank bearer ID, however, method 500 may proceed to step 535.

At step 535, PCRN 200 may place the UE_ONLY rules without a bearer identifier on a timer by, for example, creating a deferred task. PCRN 200 may then wait for the deferral period to elapse in step 540 and then proceed to step 545. In step 545, PCRN 200 may determine whether any of the deferred rules are associated with a bearer control mode of UE_ONLY. In various alternative embodiments, method 500 may not include step 545 and, instead, proceed directly to step 550. In various alternative embodiments, PCRN 200 may perform step 545 with regard to all rules associated with the application request rather than just those which have been deferred.

If the PCRN 200 determines at step 545 that none of the rules are associated with a bearer control mode of UE_ONLY, method 500 may proceed to step 565. If, on the other hand, the PCRN 200 determines at step 545 that at least one rule is associated with a bearer control mode of UE_ONLY, method 500 may proceed to step 550. At step 550, PCRN 200 may determine whether any of the UE_ONLY rules are not associated with a bearer. If none of the UE_ONLY rules have a null or blank bearer ID, method 500 may proceed to step 565. Otherwise, method 500 may proceed to step 555.

In step 555, PCRN 200 may perform a cleanup procedure. Such a cleanup procedure may include deleting the UE_ONLY rules that are unassociated with a bearer from local storage. PCRN 200 may also instruct the appropriate SGWs or PGWs to uninstall the appropriate rules if they have been previously installed. Next, PCRN 200 may construct and transmit a RAR informing the AF that at least part of the request could not be fulfilled. Finally, method 500 may end at step 565.

Figure 6:
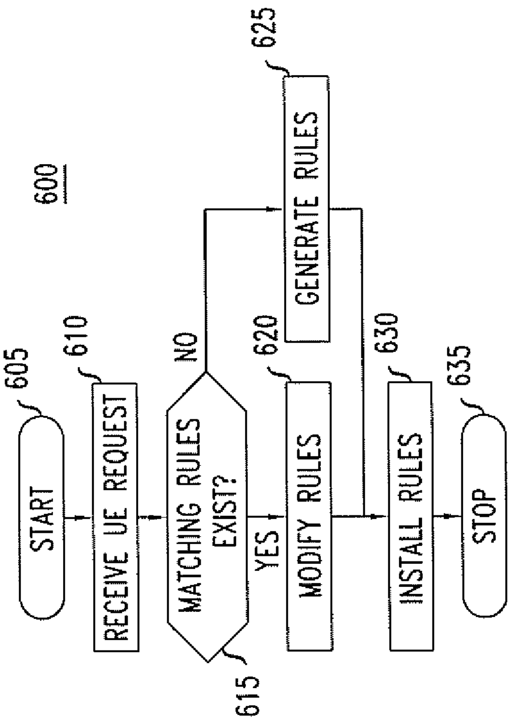
FIG. 6 illustrates an exemplary method for updating PCC rules when a second relevant message arrives.

FIG. 6 illustrates an exemplary method 600 for updating PCC rules when a second relevant message arrives. Method 600 may be performed by the components of PCRN 200 such as, for example, request handler 210, rule generator 215, and/or rule modifier 255.

Method 600 may begin in step 605 and proceed to step 610 where PCRN 200 may receive a UE request message from an SGW or PG-W. Method 600 may then proceed to step 615, where PCRN 200 may determine whether the request corresponds to any existing rules. PCRN 200 may math a request to existing rules according to any method know to those of skill in the art such as, for example, comparing session binding identifiers (SBIs). If matching rules do exist, the request may be deemed a complementary request and method 600 may proceed to step 620 where PCRN 200 may modify each of the existing rules based on information carried by the complementary request. For example, PCRN 200 may associate each matching rule with a bearer identifier carried by the complementary request.

If, on the other hand, the request is not a complementary request, method 600 may proceed from step 615 to step 625, where PCRN 200 may generate a new set of rules based on the received request. PCRN 200 may then instruct various network nodes to install the new or modified rules in step 630 and method 600 may end in step 635.

Having described exemplary components and methods for the operation of exemplary subscriber network 100 and PCRN 200, an example of the operation of exemplary network 100 and PCRN 200 will now be provided with reference to FIGS. 1-6. PCRN 136 may correspond to PCRN 200.

The process may begin when PCRN 136, 200 receives AAR 160 requesting two SDFs for user "0x05DA." Rule generator 215 may then generate rules 340 and 345 to fulfill the request in step 515. In steps 520 and 530, rule generator 215 may determine that both rules are associated with a bearer control mode of UE_ONLY and are not yet associated with a bearer identifier. Timer 225 may then create deferred task 420 in step 535 and wait for the expiration of a predetermined time period of 200 ms.

While PCRN 136, 200 is awaiting the expiration of the deferral time for deferred tasks 415, 420, PCRN 136, 200 may receive CCR 170 and determine that it is a complementary message for an existing rule at step 615. Rule modifier 255 may then modify rule 335 in step 620 to include the bearer ID "0xB544," as is already shown in FIG. 3. PCRN 136, 200 may then install the modified rule in SGW 132 and PGW 134.

When the system time reaches "21120347," timer 225 may determine that 200 ms has passed since deferred task 415 was created. Pending rule identifier 230 may then determine that no further action should be taken because rule "0x99B2" is now associated with a bearer identifier. Likewise, when the system time reaches "21120391," timer 225 may determine that 200 ms has passed since deferred task 420 was created.

Pending rule identifier 230 may determine in steps 545, 550 that rules 345, 350 are associated with a bearer control mode of UE_ONLY but are not associated with a bearer identifier, respectively. Cleanup handler 235 may then remove rules 340, 345 from rule storage 220 in step 555. Finally, notification transmitter 240 may generate and transmit a RAR to AF 150 in step 560 to indicate that fulfillment of the request carried by AAR 160 has failed.

According to the foregoing, various exemplary embodiments provide for a system that utilizes a robust method for ensuring that only valid rules are installed at various network components. Particularly, by waiting for a period of time to receive a complementary message, a PCRN may clean up only those rules for which the PCRN is unlikely to receive a complementary message.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for use by a policy and charging rules node (PCRN) comprising a memory and a hardware processor to determine whether a policy and charging control (PCC) rule is awaiting further action, the method comprising:

receiving, at the PCRN from a first requesting device, a first message including a first set of information regarding a request for establishment of an application;

generating a set of PCC rules for fulfilling the application request based on the first set of information;

determining that the PCRN should wait for a period of time for at least one PCC rule of the set of PCC rules to receive a second message including a second set of information regarding the request for establishment of the application, wherein the second set of information is different from and supplements the second set of information;

waiting for the period of time to receive the second message including the second set of information regarding the application request;

determining, after the period of time has elapsed, whether the second message has arrived; and initiating a cleanup procedure based on a determination that the second message has not arrived; and updating at least one PCC rule of the set of PCC rules to include information carried by the second message based on a determination that the second message has arrived.

2. The method of claim 1, wherein the step of determining whether the second message has arrived comprises, for each PCC rule of the at least one PCC rule:

determining whether the PCC rule is associated with information expected to be included in the second set of information;

if the PCC rule is associated with information expected to be included in the second set of information, determining that the second message has arrived; and if the PCC rule is not associated with information expected to be included in the second set of information, determining that the second message has not arrived.

3. The method of claim 2, wherein the information expected to be included in the second set of information is a bearer identifier.

4. The method of claim 1, wherein the step of determining whether the PCRN should wait for the period of time for at least one PCC rule of the set of PCC rules comprises, for each PCC rule of the set of PCC rules:

determining whether a value associated with the PCC rule indicates that the second message is required for the PCC rule;

if the value associated with the PCC rule indicates that the second message is required for the PCC rule:

determining whether the PCC rule is associated with information expected to be included in the second set of information, if the PCC rule is associated with information expected to be included in the second set of information, determining that the PCRN should not wait for the period of time for the PCC rule, and if the PCC rule is not associated with information expected to be included in the second set of information, determining that the PCRN should wait for the period of time for the PCC rule; and if the value associated with the PCC rule indicates that the second message is not required for the PCC rule, determining that the PCRN should not wait for the period of time for the PCC rule.

5. The method of claim 4, wherein the value associated with the PCC rule is a bearer control mode and the information expected to be included in the second set of information is a bearer identifier.

6. The method of claim 1, wherein the cleanup procedure comprises at least one of: uninstalling a PCC rule, deleting a PCC rule from a rules storage, and sending a notification to the first requesting device.

7. A policy and charging rules node (PCRN) comprising:
- an interface that receives a first message from a first requesting device including a first set of information regarding a request for establishment of an application;
- a rule generator that:
  - generates a set of PCC rules for fulfilling the application request based on the first set of information, and
  - determines that the PCRN should wait for a period of time for at least one PCC rule of the set of PCC rules to receive a second message including a second set of information regarding the request for establishment of the application, wherein the second set of information is different from and supplements the first set of information;
- a timer that indicates when the period of time has elapsed;
- a pending rule identifier that, after the timer indicates that the period of time has elapsed, determines whether the second message has arrived; and
- a cleanup handler that, if the second message has not arrived, initiates a cleanup procedure,
- a rule modifier that, if the second message has arrived, updates at least one PCC rule of the set of PCC rules to include information carried by the second message,
- wherein at least one of the rule generator, the timer, the pending rule identifier, the cleanup handler, and the rule modifier is implemented by at least one hardware processor.

8. The PCRN of claim 7, wherein, in determining whether the second message has arrived, the pending rule identifier, for each PCC rule of the at least one PCC rule:
- determines whether the PCC rule is associated with information expected to be included in the second set of information;
- if the PCC rule is associated with information expected to be included in the second set of information, determines that the second message has arrived; and
- if the PCC rule is not associated with information expected to be included in the second set of information, determines that the second message has not arrived.

9. The PCRN of claim 8, wherein the information expected to be included in the second set of information is a bearer identifier.

10. The PCRN of claim 7, wherein, in determining whether the PCRN should wait for the period of time, the rule generator, for each PCC rule of the set of PCC rules:
- determines whether a value associated with the PCC rule indicates that the second message is required for the PCC rule;
- if the value associated with the PCC rule indicates that the second message is required for the PCC rule:
  - determines whether the PCC rule is associated with information expected to be included in the second set of information,
  - if the PCC rule is associated with information expected to be included in the second set of information, determines that the PCRN should not wait for the period of time for the PCC rule, and
  - if the PCC rule is not associated with information expected to be included in the second set of information, determines that the PCRN should wait for the period of time for the PCC rule; and
- if the value associated with the PCC rule indicates that the second message is not required for the PCC rule, determines that the PCRN should not wait for the period of time for the PCC rule.

11. The PCRN of claim 10, wherein the value associated with the PCC rule is a bearer control mode and the information expected to be included in the second set of information is a bearer identifier.

12. The PCRN of claim 7, further comprising a notification transmitter that, when the cleanup handler initiates a cleanup procedure, transmits a notification to the first requesting device that at least part of the application request was not fulfilled.

13. A non-transitory machine-readable storage medium encoded with instructions for use by a policy and charging rules node (PCRN) to determine whether a policy and charging control (PCC) rule is awaiting further action, the machine-readable storage medium comprising:
- instructions for receiving, at the PCRN from a first requesting device, a first message including a first set of information regarding a request for establishment of an application;
- instructions for generating a set of PCC rules for fulfilling the application request based on the first set of information;
- instructions for determining that the PCRN should wait for a period of time for at least one PCC rule of the set of PCC rules to receive a second message including a second set of information regarding the request for establishment of the application, wherein the second set of information is different from and supplements the first set of information;
- instructions for waiting for the period of time to receive the second message including the second set of information regarding the application request;
- instructions for determining, after the period of time has elapsed, whether the second message has arrived; and
- instructions for, if the second message has not arrived, initiating a cleanup procedure; and
- instructions for, if the second message has arrived, updating at least one PCC rule of the set of PCC rules to include information carried by the second message.

14. The non-transitory machine-readable storage medium of claim 13, wherein the instructions for determining whether the second message has arrived comprise, for each PCC rule of the at least one PCC rule:
- instructions for determining whether the PCC rule is associated with information expected to be included in the second set of information;
- instructions for, if the PCC rule is associated with information expected to be included in the second set of information, determining that the second message has arrived; and
- instructions for, if the PCC rule is not associated with information expected to be included in the second set of information, determining that the second message has not arrived.

15. The non-transitory machine-readable storage medium of claim 14, wherein the information expected to be included in the second set of information is a bearer identifier.

16. The non-transitory machine-readable storage medium of claim 13, wherein the instructions for determining whether the PCRN should wait for the period of time for at least one PCC rule of the set of PCC rules comprise, for each PCC rule of the set of PCC rules:

instructions for determining whether a value associated with the PCC rule indicates that the second message is required for the PCC rule;

instructions for, if the value associated with the PCC rule indicates that the second message is required for the PCC rule:

determining whether the PCC rule is associated with information expected to be included in the second set of information, if the PCC rule is associated with information expected to be included in the second set of information, determining that the PCRN should not wait for the period of time for the PCC rule, and if the PCC rule is not associated with information expected to be included in the second set of information, determining that the PCRN should wait for the period of time for the PCC rule; and instructions for, if the value associated with the PCC rule indicates that the second message is not required for the PCC rule, determining that the PCRN should not wait for the period of time for the PCC rule.

17. The non-transitory machine-readable storage medium of claim 16, wherein the value associated with the PCC rule is a bearer control mode and the information expected to be included in the second set of information is a bearer identifier.

18. The non-transitory machine-readable storage medium of claim 13, wherein the cleanup procedure comprises at least one of: instructions for uninstalling a PCC rule, instructions for deleting a PCC rule from a rules storage, and instructions for sending a notification to the first requesting device.

* * * * *